US009409665B1

(12) United States Patent
Gregory

(10) Patent No.: US 9,409,665 B1
(45) Date of Patent: Aug. 9, 2016

(54) PORTABLE BAG WITH REMOVABLE AND COLLAPSIBLE CARRIAGE STAND

(76) Inventor: David G. Gregory, Coos Bay, OR (US)

( * ) Notice: Subject to any disclaimer, the term of this patent is extended or adjusted under 35 U.S.C. 154(b) by 1109 days.

(21) Appl. No.: 12/804,207

(22) Filed: Jul. 16, 2010

Related U.S. Application Data

(60) Provisional application No. 61/271,183, filed on Jul. 17, 2009.

(51) Int. Cl.
| | | |
|---|---|---|
| *B65B 67/12* | (2006.01) | |
| *B65B 67/00* | (2006.01) | |
| *B62B 3/02* | (2006.01) | |
| *B62B 3/10* | (2006.01) | |
| *B65F 1/06* | (2006.01) | |
| *D06F 95/00* | (2006.01) | |
| *B65D 33/02* | (2006.01) | |
| *B65D 61/00* | (2006.01) | |
| *B65D 1/32* | (2006.01) | |
| *B65D 6/34* | (2006.01) | |
| *B65D 8/08* | (2006.01) | |

(52) U.S. Cl.
CPC .............. *B65B 67/1205* (2013.01); *B62B 3/02* (2013.01)

(58) Field of Classification Search
CPC  B65B 67/1205; B65B 67/1255; B65B 67/00; B62B 3/02; B62B 3/027; B62B 3/106; B62B 2202/40; B62B 2205/06; B65F 1/06; D06F 95/004; B65D 33/02; B65D 61/00
USPC ...................... 220/9.1, 9.2, 9.3, 9.4; 280/651; 248/136, 188.6
See application file for complete search history.

(56) References Cited

U.S. PATENT DOCUMENTS

| | | | | | |
|---|---|---|---|---|---|
| 4,246,945 | A | * | 1/1981 | Sterling | ........................... 383/43 |
| 4,739,527 | A | * | 4/1988 | Kohus et al. | ..................... 5/99.1 |
| 4,989,749 | A | * | 2/1991 | Choi | ........................... 280/47.34 |
| 6,929,230 | B2 | * | 8/2005 | Tsai | .............................. 248/436 |
| 2004/0222617 | A1 | * | 11/2004 | Darling, III | ................... 280/651 |

* cited by examiner

*Primary Examiner* — Fenn Mathew
*Assistant Examiner* — Andrew T Kirsch
(74) *Attorney, Agent, or Firm* — Robert E. Howard

(57) ABSTRACT

A portable bag assembly having a bag portion and a removable and collapsible carriage subassembly. The carriage subassembly has a plurality of legs having upper portions which are removably received and held by the bag portion. The portable bag assembly can be used for transporting a plurality of large balls and holding the plurality of balls at a comfortable height during practice. The portable bag assembly may also be used as a portable laundry hamper.

2 Claims, 4 Drawing Sheets

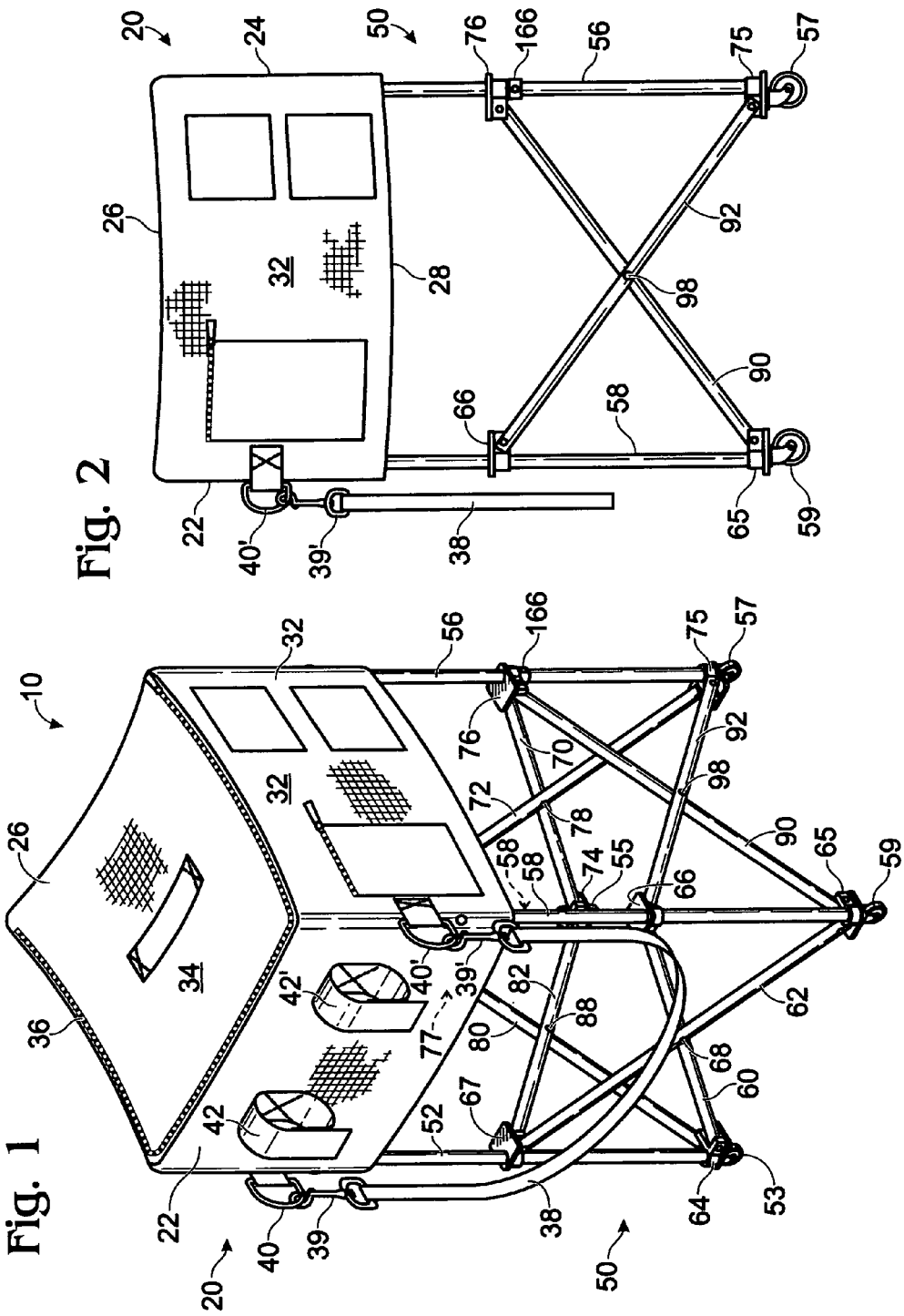

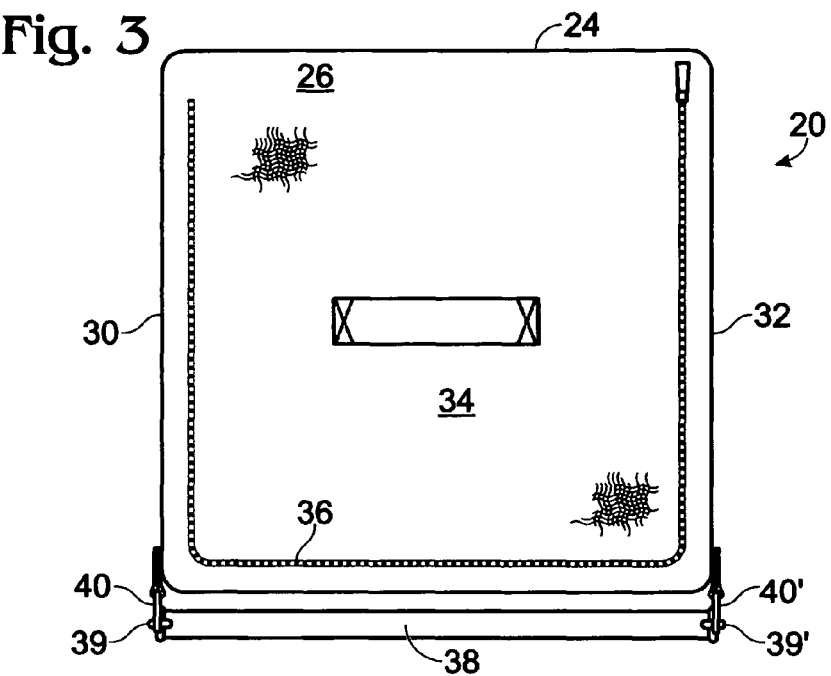
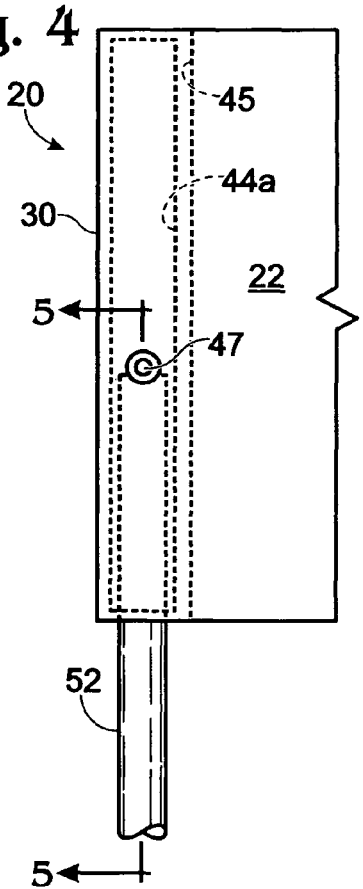
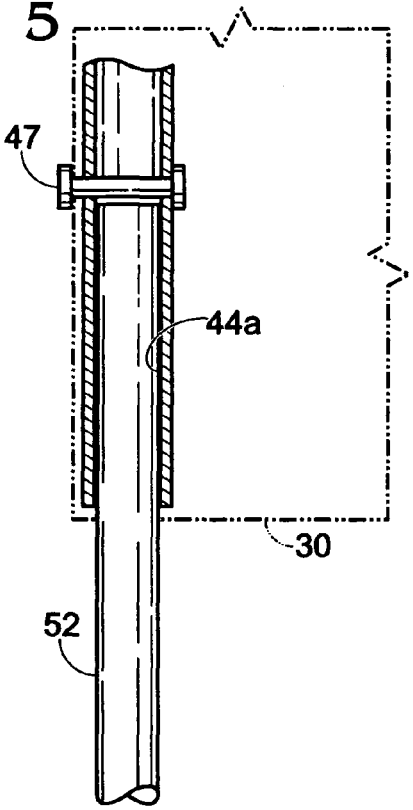

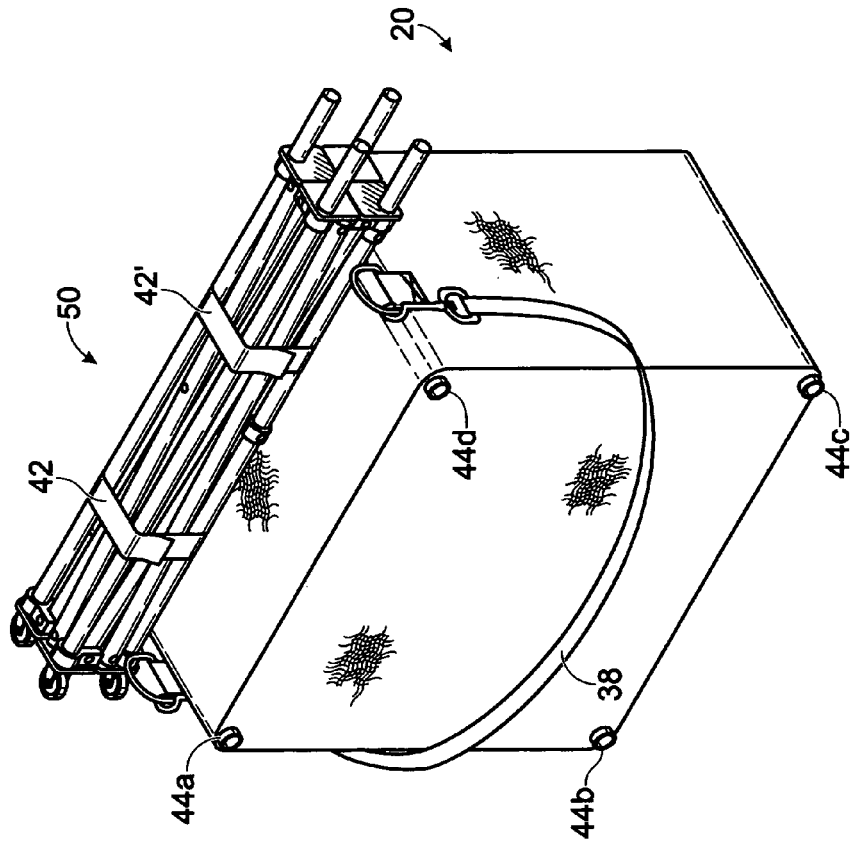
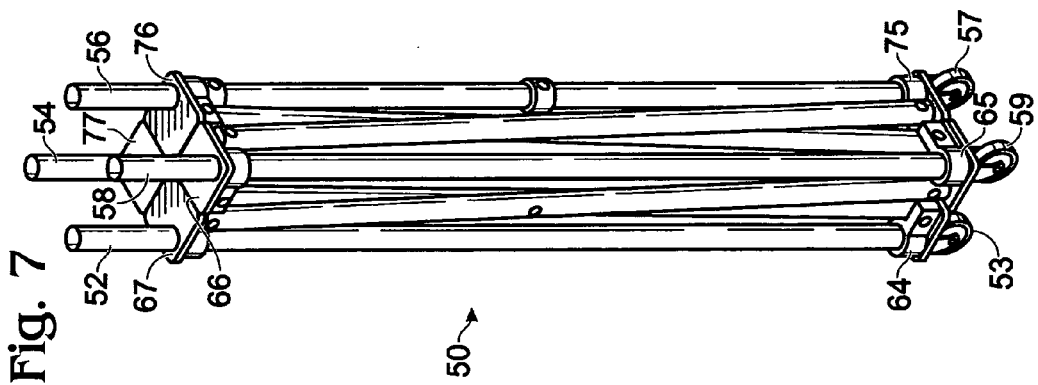

PORTABLE BAG WITH REMOVABLE AND COLLAPSIBLE CARRIAGE STAND

CROSS-REFERENCE TO RELATED APPLICATIONS

This application claims the benefit of U.S. Provisional Application No. 61/271,183 filed Jul. 17, 2009.

BACKGROUND OF THE INVENTION

The present invention relates to a portable bag with a removable and collapsible carriage stand.

The present invention can be used as a portable ball cart for transporting large balls and providing a rolling cart for holding practice balls. It can also be used as a laundry hamper and for other uses where a removable stand would be desirable.

In games using large balls, such as basketballs and volleyballs, much time is spent in practice where a large number of readily available balls is desirable.

Wheeled carts are often used to hold a large number of such balls. The cart can be easily moved about the practice court to where the balls are needed. One such cart is described in U.S. Design Pat. D522,207.

Such carts are large and cannot be easily transported beyond the practice facility. When a team travels from its own facility to another for a game it has been difficult to transport balls that can be used for pre-game practice, and the availability of a wheeled cart at the facility being visited for holding practice balls is at the mercy of the home team.

Laundry hampers are typically placed in or near bathrooms to hold soiled clothing, towels, etc. When it is time to wash the items contained within the hamper they must be removed from the hamper, which is typically not portable, and carried by hand to the laundry room.

SUMMARY OF THE INVENTION

It is an object of the present invention to provide a portable bag having a removable and collapsible carriage stand. When the bag is removed from the carriage stand it can be easily moved from one location to another.

The portable bag assembly of the present invention has a bag portion and a collapsible carriage subassembly.

The carriage subassembly has a plurality of legs having upper portions which are removably received and held by leg holders attached to or contained within the bag portion.

Upon removal of the bag from the carriage subassembly the carriage subassembly can be collapsed by bringing the legs towards each other. The collapsed carriage can be attached to the bag portion by attachment means for easy transport.

BRIEF DESCRIPTION OF THE DRAWINGS

FIG. 1 is a front perspective view of the portable bag assembly of the present invention;

FIG. 2 is a side elevation view of the portable bag assembly;

FIG. 3 is a top plan view of the portable bag assembly;

FIG. 4 is a partial left front elevation view of the bag portion of the portable bag assembly with a leg of the carriage subassembly shown in cross-section;

FIG. 5 is a partial view taken along line 5-5 of FIG. 4 of one of the carriage legs shown inserted into a leg holder located within the bag portion;

FIG. 7 is a view of the carriage subassembly of the portable bag assembly shown in its collapsed configuration; and FIG. 8 is a perspective view of the portable bag assembly shown with its collapsed carriage subassembly attached thereto for transport.

DESCRIPTION OF PREFERRED EMBODIMENTS

Figure 6:
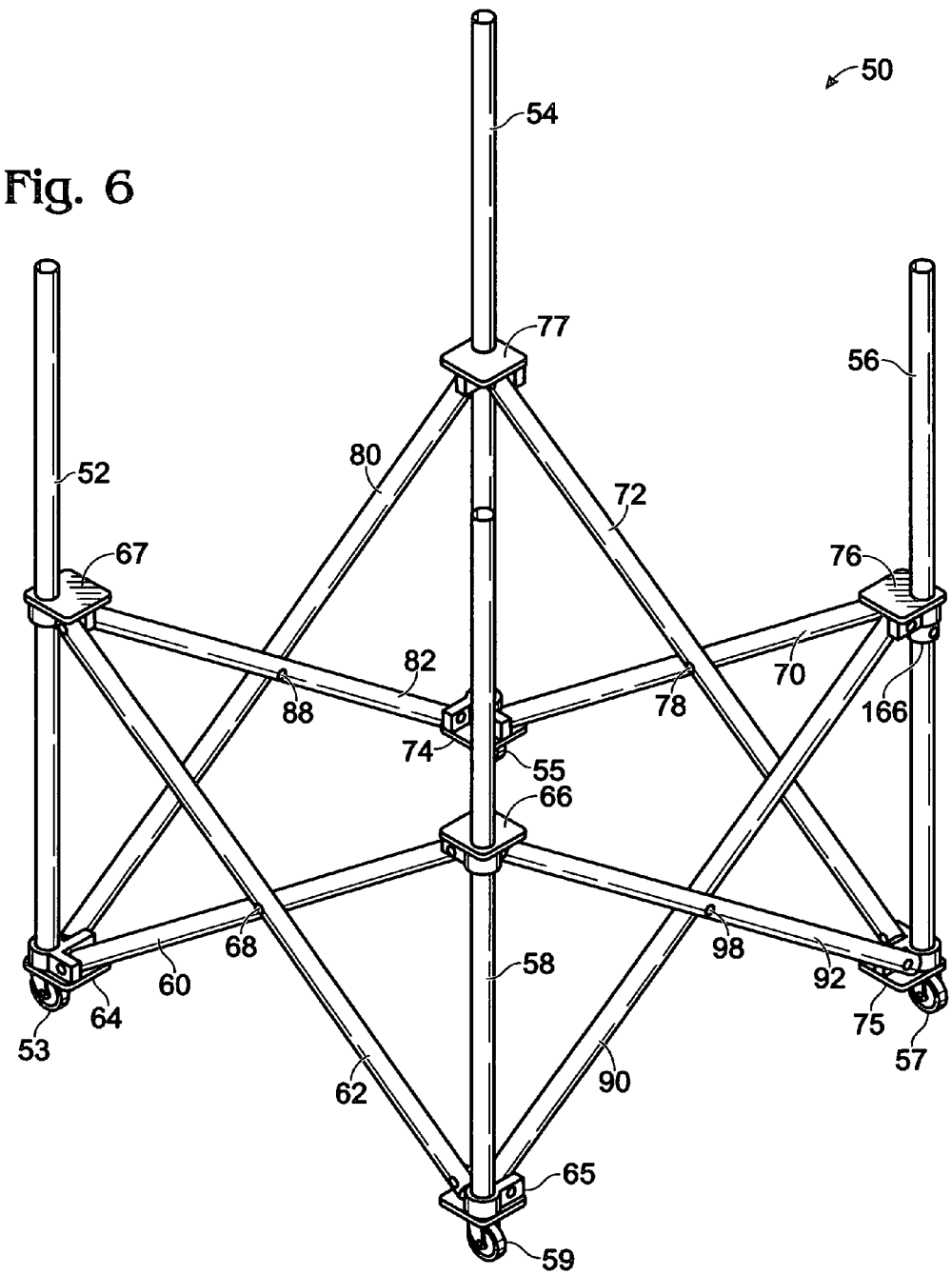
FIG. 6 is a front perspective view of the carriage subassembly of the portable bag assembly shown in its erected configuration.

The portable ball cart 10 is comprised of a bag portion 20 and a carriage portion 50.

Bag portion 20 has a front wall 22, a rear wall 24, a top 26, a bottom 28, a left side wall 30, and a right side wall 32. Bag portion 20 is preferably made of a flexible cloth which can be folded up.

Top 26 of bag portion 20 has a sealable flap 34 removably attached along three sides thereof to top 26 by a fastener such as zipper 36, which allows flap to be closed or opened to gain access to the interior of bag portion 20.

A shoulder strap 38 is removably attached by snaps 39, 39' to left and right side walls 30, 32 by left and right D-rings 40 and 40', respectively.

As best seen in FIG. 1, left and right carriage attachment straps 42 and 42' have center portions that are attached to front wall 22 by any suitable means, such as sewing. The free ends of attachment straps 42, 42' are of a hook and loop construction, such as VELCRO®, which allows them to be wrapped around collapsed carriage 50 and removably attached to each other in a manner well known in the hook and loop art. Preferably straps 42, 42' are formed of a stretchable material to allow a tight fit around collapsed carriage 50, as seen in FIG. 8. Straps 42, 42' could be located on a panel other than front wall 22.

If portable bag assembly 10 is to be used as a laundry hamper, it may not be necessary to transport the carriage subassembly 50 while carrying the bag portion 20 to the laundry room, in which case straps 42 and 42' can be omitted. When used as a laundry hamper, the bag portion 20 of portable bag assembly 10 may have all or portions of side walls 30, 32, front wall 22, rear wall 24, flap 34 and/or bottom 28 formed of a breathable fabric, such as netting.

Vertically disposed tubular leg holders 44a, 44b, 44c, and 44d (FIG. 8) are located in the corners of bag portion 20 and are inserted into pockets 45 (only one of which is shown in FIG. 4) with the upper ends thereof abutting against the top 26. Leg holders 44a, 44b, 44c, and 44d are each attached to the adjacent wall of bag portion 20 by a fastener that acts as stop member 47 (only one of which is shown in FIGS. 4 and 5), which fastener can be a rivet or threaded fastener.

As seen in FIG. 5, stop member 47 prevents leg 52 from movement upwardly within leg holder 44a beyond the location thereof.

Although it is preferred to use leg holders 44a, 44b, 44c, and 44d when portable bag assembly 10 is being used to transport balls, they can be omitted when it is being used as a laundry hamper, and legs 52, 54, 56, and 58 inserted directly into pockets 45 in which case it is preferred that pockets 45 be narrower at the top than at the bottom to provide a better fit.

When used for transporting balls, bag 20 is of a size that, when filled with balls, can be easily carried by an individual. Typically the size is selected to be able to transport the equivalent of 10-12 volleyballs.

Carriage subassembly 50 has four tubular legs 52, 54, 56, and 58 which are vertically disposed in the erected configuration shown in FIGS. 1 and 6. Where the portable bag assembly 10 is to be used for transporting balls, the lower ends of legs 52, 54, 56, and 58 are preferably attached to swivel wheels 53, 55, 57, and 59, respectively, in a manner well known in the art. Where the portable bag assembly 10 is to be used as a laundry hamper, swivel wheels 53, 55, 57, and 59 may be omitted.

A first tubular front cross member 60 extends between a lower portion of left front leg 52 and an upper portion of right front leg 58. A second tubular front cross member 62 extends between an upper portion of left front leg 52 and a lower portion of right front leg 58. The lower ends of cross members 60 and 62 are pivotally attached to the lower portions of legs 52 and 58 by pivot members 64 and 65, respectively. The upper ends of cross members 60 and 62 are attached to sliding members 66 and 67, respectively. Sliding members 66 and 67 are adapted to slide up and down legs 52 and 58, respectively. The mid portions of cross members 60 and 62 are pivotally connected by a pivot pin 68 which allows legs 52 and 54 to move from a first, erected position shown in FIGS. 1 and 6 to a second, collapsed position shown in FIG. 7.

A first tubular rear cross member 70 extends between a lower portion of left rear leg 54 and an upper portion of right rear leg 56. A second tubular rear cross member 72 extends between an upper portion of left rear leg 54 and a lower portion of right rear leg 56. The lower ends of cross members 70 and 72 are pivotally attached to the lower portions of legs 54 and 56 by pivot members 74 and 75, respectively. The upper ends of cross members 70 and 72 are attached to sliding members 76 and 77, respectively. Sliding members 76 and 77 are adapted to slide up and down legs 52 and 58, respectively. The mid portions of cross members 70 and 72 are pivotally connected by a pivot pin 78 which allows legs 54 and 56 to move from a first, erected position shown in FIGS. 1 and 6 to a second, collapsed position shown in FIG. 7.

A stop member 166 is attached to right rear leg 56 at a mid-portion thereof and prevents sliding member 76 from descending below its mid-portion location, which, in turn, prevents the other sliding members 66, 67, and 77, from descending below the mid-portions of their respective associated legs. Stop member 166 could be located on any one or more of legs 52, 54, 56, or 58.

A first tubular left side cross member 80 extends between a lower portion of left front leg 52 and an upper portion of left rear leg 54. A second tubular left side cross member 82 extends between an upper portion of left front leg 52 and a lower portion of left rear leg 54. The lower ends of cross members 80 and 82 are pivotally attached to the lower portions of legs 52 and 54 by pivot members 64 and 74, respectively. The upper ends of cross members 80 and 82 are attached to sliding members 77 and 67, respectively. Sliding members 86 and 87 are adapted to slide up and down legs 52 and 55, respectively. The mid portions of cross members 80 and 82 are pivotally connected by a pivot pin 88 which allows legs 52 and 54 to move from a first, erected position shown in FIGS. 1 and 6 to a second, collapsed position shown in FIG. 7.

A first tubular right side cross member 90 extends between a lower portion of right front leg 58 and an upper portion of right rear leg 56. A second tubular right side cross member 92 extends between an upper portion of right front leg 58 and a lower portion of right rear leg 56. The lower ends of cross members 90 and 92 are pivotally attached to the lower portions of legs 58 and 56 by pivot members 65 and 75, respectively. The upper ends of cross members 90 and 92 are attached to sliding members 76 and 66, respectively. Sliding members 76 and 66 are adapted to slide up and down legs 58 and 56, respectively. The mid portions of cross members 90 and 92 are pivotally connected by a Pivot pin 98 which allows legs 58 and 56 to move from a first, erected position shown in FIGS. 1 and 6 to a second, collapsed position shown in FIG. 7.

Legs 52, 54, 56, and 58 are, preferably, substantially equally spaced apart in the erected configuration of carriage subassembly 50 so that when carriage subassembly 50 is converted into its collapsed configuration, sliding members 66, 67, 76, and 77 are located at substantially the same height on legs 52, 54, 56, and 58, respectively (FIG. 7).

In its erected configuration, the upper portions of tubular legs 52, 54, 56, and 58 of the carriage subassembly 50 are removably inserted into vertically disposed tubular leg holders 44a, 44b, 44c, and 44d, as best seen in FIGS. 4, 6, and 8.

To transport balls, portable bag assembly 10 is converted from the erected configuration shown in FIG. 1 where tubular legs 52, 54, 56, and 58 are spaced apart to the collapsed, portable configuration where legs 52, 54, 56, and 58 are in substantial abutment, as shown in FIG. 8. This is accomplished by removing tubular legs 52, 54, 56, and 58 from tubular leg holders 44a, 44b, 44c, and 44d, leaving the carriage subassembly 50 in its erected, bag-free configuration shown in FIG. 6. The legs 52, 54, 56, and 58 are then collapsed towards each other into the collapsed configuration shown in FIG. 7. The collapsed carriage subassembly 50 is then attached to bag portion 20 by means of attachment straps 42, 42'. The bag 20 and attached carriage 50 can then be carried by placing shoulder strap 38 over the shoulder of the person transporting the portable ball cart 10.

When it is desired to merely store portable bag assembly 10, bag portion 20 can be left on carriage 50 (with all balls removed) and, since bag portion 20 is formed of a flexible cloth material, it will collapse inwardly together with legs 52, 54, 56, and 58.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A portable bag assembly comprising:
 - a bag portion for holding items to be transported, said bag portion having a front wall, rear wall, bottom, top and left and right side walls extending between said front and rear walls, the intersections of said side walls and front and rear walls forming four substantially vertical corners;
 - a pocket formed at each of said four corners of said bag portion, each of said pockets extending substantially from the top of said bag portion to the bottom of said bag portion;
 - a carriage subassembly having four legs, each leg having an upper end and a lower end;
 - said pockets of said bag portion being configured to releasably receive and hold said upper ends of said legs; and
 - first and second cross members extending between adjacent legs, each of said cross members having an upper end and a lower end, said first and second cross members adapted to allow said adjacent legs to be collapsed towards each other;
 - wherein said pockets are formed on the inside of each of said four corners of said bag portion; and
 - wherein each of said pockets has a tubular leg holder located within said pocket, each of said leg holders adapted to receive and hold said upper ends of one of said legs of said carriage subassembly.

2. The portable bag assembly of claim 1 wherein each of said tubular leg holders is attached to said pocket with a fastener adapted to act as a stop member to prevent upward movement of the upper end of an inserted leg past said fastener.

\* \* \* \* \*